(12) United States Patent
Yun et al.

(10) Patent No.: US 11,527,359 B2
(45) Date of Patent: Dec. 13, 2022

(54) MULTILAYER CERAMIC ELECTRONIC COMPONENT AND MANUFACTURING METHOD THEREOF

(71) Applicant: SAMSUNG ELECTRO-MECHANICS CO., LTD., Suwon-si (KR)

(72) Inventors: Hyung Duk Yun, Suwon-si (KR); Young Hoon Song, Suwon-si (KR); Dong Hwi Shin, Suwon-si (KR); Seon Young Yoo, Suwon-si (KR); Yu Seop Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 143 days.

(21) Appl. No.: 16/940,777

(22) Filed: Jul. 28, 2020

(65) Prior Publication Data

US 2021/0193387 A1 Jun. 24, 2021

(30) Foreign Application Priority Data

Dec. 18, 2019 (KR) .................. 10-2019-0169619

(51) Int. Cl.
*H01G 4/012* (2006.01)
*H01G 4/30* (2006.01)
(Continued)

(52) U.S. Cl.
CPC ........... *H01G 4/012* (2013.01); *H01G 4/0085* (2013.01); *H01G 4/2325* (2013.01); *H01G 4/30* (2013.01)

(58) Field of Classification Search
CPC ........ H01G 4/30; H01G 4/012; H01G 4/1227; H01G 4/2325; H01G 4/008; H01G 4/0085; H01G 4/12; H01G 4/224; H01G 4/1236
See application file for complete search history.

(56) References Cited

U.S. PATENT DOCUMENTS

2009/0303655 A1* 12/2009 Ogawa ............... H01G 4/30
29/25.42
2012/0077020 A1 3/2012 Muramatsu
(Continued)

FOREIGN PATENT DOCUMENTS

JP 1997-120930 A 5/1997
JP H09-260203 A 10/1997
(Continued)

OTHER PUBLICATIONS

Office Action issued in corresponding Korean Patent Application No. 10-2019-0169619 dated Mar. 19, 2021, with English translation.

*Primary Examiner* — Michael P McFadden
(74) *Attorney, Agent, or Firm* — Morgan, Lewis & Bockius LLP

(57) ABSTRACT

A multilayer ceramic electronic component includes a ceramic body having a capacitance forming portion in which first and second internal electrodes are alternately laminated with respective dielectric layers interposed therebetween, and first and second external electrodes respectively disposed on surfaces of the ceramic body. The first and second internal electrodes are respectively exposed to surfaces of the ceramic body, and first and second protrusions, each including a carbon compound, are respectively disposed on end portions of the first and second internal electrodes exposed to the surfaces of the ceramic body.

26 Claims, 6 Drawing Sheets

(51) Int. Cl.
*H01G 4/232* (2006.01)
*H01G 4/008* (2006.01)

(56) References Cited

U.S. PATENT DOCUMENTS

| | | | |
|---|---|---|---|
| 2012/0327558 A1* | 12/2012 | Jeong | H01G 4/008 |
| | | | 977/788 |
| 2014/0301014 A1 | 10/2014 | Kim | |
| 2015/0155097 A1 | 6/2015 | Kim et al. | |
| 2015/0170786 A1* | 6/2015 | Hong | H01B 1/24 |
| | | | 427/79 |
| 2015/0187500 A1* | 7/2015 | Kang | H01G 4/2325 |
| | | | 427/79 |
| 2016/0087189 A1* | 3/2016 | Lee | H01L 41/273 |
| | | | 29/25.35 |
| 2017/0301468 A1* | 10/2017 | Kim | H01G 4/232 |
| 2019/0131074 A1* | 5/2019 | Mizuno | H01G 4/30 |

FOREIGN PATENT DOCUMENTS

| | | |
|---|---|---|
| JP | 2008-181949 A | 8/2008 |
| KR | 10-2012-0030046 A | 3/2012 |
| KR | 10-2014-0121728 A | 10/2014 |
| KR | 10-2015-0064522 A | 6/2015 |

* cited by examiner

MULTILAYER CERAMIC ELECTRONIC COMPONENT AND MANUFACTURING METHOD THEREOF

CROSS-REFERENCE TO RELATED APPLICATION(S)

This application claims the benefit under 35 USC 119(a) of Korean Patent Application No. 10-2019-0169619 filed on Dec. 18, 2019 in the Korean Intellectual Property Office, the entire disclosure of which is incorporated herein by reference for all purposes.

BACKGROUND

1. Field

The present disclosure relates to a multilayer ceramic electronic component and a method of manufacturing the same.

2. Description of Related Art

With the recent trend for miniaturization of electronic products, demand has increased for multilayer ceramic electronic components that are miniaturized while having high capacitance. Such multilayer ceramic electronic components are generally manufactured by mixing a ceramic raw material with a solvent, a binder, and the like, to prepare slurry and applying a thin film of slurry to form a ceramic green sheet. The ceramic green sheet and a sheet on which an internal electrode is printed are alternately laminated, and a binder removal treatment and a sintering process are then performed to sinter a material from which a binder, or the like, is discharged.

However, it may be significantly difficult to entirely remove a carbon compound, even though the above-mentioned binder removal process. When a transition metal having high carbon solubility is used as a material of an internal electrode, a carbon layer is formed on a surface of the transition metal to deteriorate electrical characteristics. In addition, such a carbon layer may interfere with bonding between interfaces to cause cracking or delamination and may act as a permeation path of external moisture, or the like.

SUMMARY

An aspect of the present disclosure is to provide a multilayer ceramic electronic component, capable of preventing oxidation of an internal electrode, and a method of manufacturing the same.

Another aspect of the present disclosure is to provide a multilayer ceramic electronic component having improved productivity and a method of manufacturing the same.

Another aspect of the present disclosure is to provide a multilayer ceramic electronic component having improved long-term reliability and a method of manufacturing the same.

According to an aspect of the present disclosure, a multilayer ceramic electronic component includes a ceramic body having fifth and sixth surfaces opposing each other in a first direction and first and second surfaces opposing each other in a third direction, and including a capacitance forming portion in which first and second internal electrodes may be alternately laminated in the third direction with respective dielectric layers interposed therebetween, and first and second external electrodes may be respectively disposed on the fifth and sixth surfaces of the ceramic body. The first and second internal electrodes may respectively be exposed to the fifth and sixth surfaces of the ceramic body. First and second protrusions, each including a carbon compound, may respectively be disposed on end portions of the first and second internal electrodes exposed to the fifth and sixth surfaces of the ceramic body.

According to an aspect of the present disclosure, a method of manufacturing a multilayer ceramic electronic component includes sintering a ceramic body including first and second internal electrodes that are alternately laminated in a third direction with respective dielectric layers interposed therebetween, and performing grain growth of carbon in end portions of the first and second internal electrodes of the ceramic body.

According to an aspect of the present disclosure, a multilayer ceramic electronic component includes a ceramic body including dielectric layers having internal electrodes disposed thereon, and one or more external electrodes disposed on the ceramic body and connected to the internal electrodes. Each internal electrode is connected to a respective external electrode of the one or more external electrodes through a carbon compound, and is spaced apart from the respective external electrode by the carbon compound.

According to an aspect of the present disclosure, a multilayer ceramic electronic component includes a ceramic body including dielectric layers having internal electrodes disposed thereon, the internal electrodes being exposed to external surfaces of the ceramic body, and one or more external electrodes disposed on the external surfaces of the ceramic body and connected to the internal electrodes. Each external electrode has a planar surface disposed on a respective external surface of the body, and a plurality of cavities extending in the planar surface and having a carbon compound therein.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
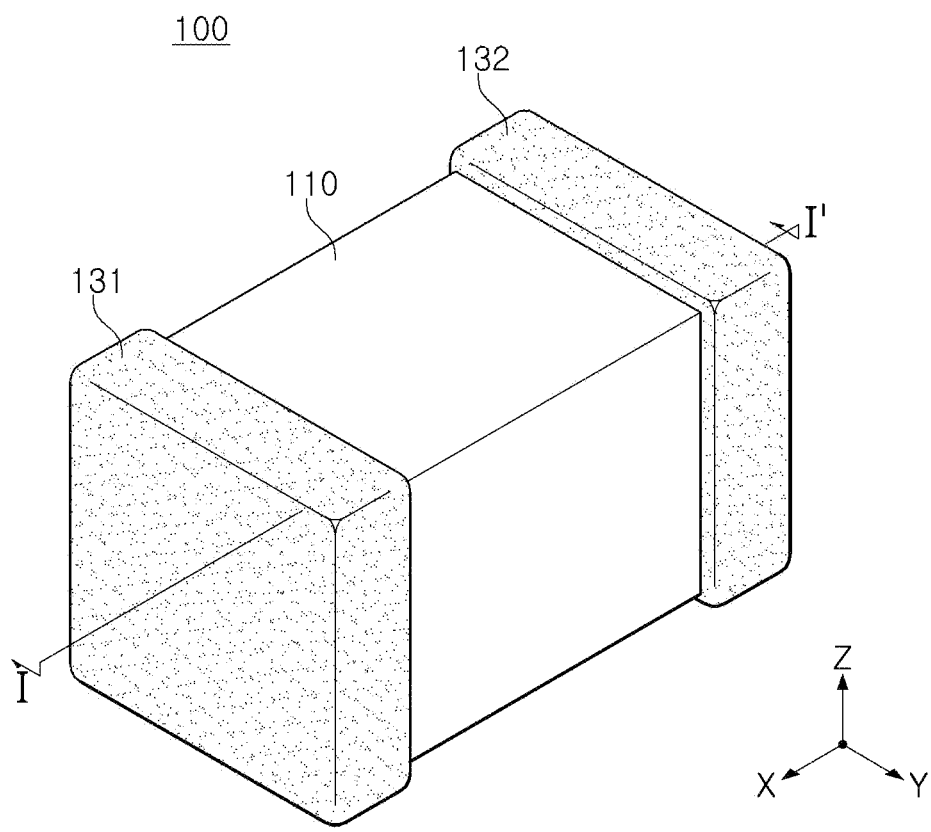
FIG. 1 is a schematic perspective view of a multilayer ceramic electronic component according to an embodiment of the present disclosure.
Figure 2:
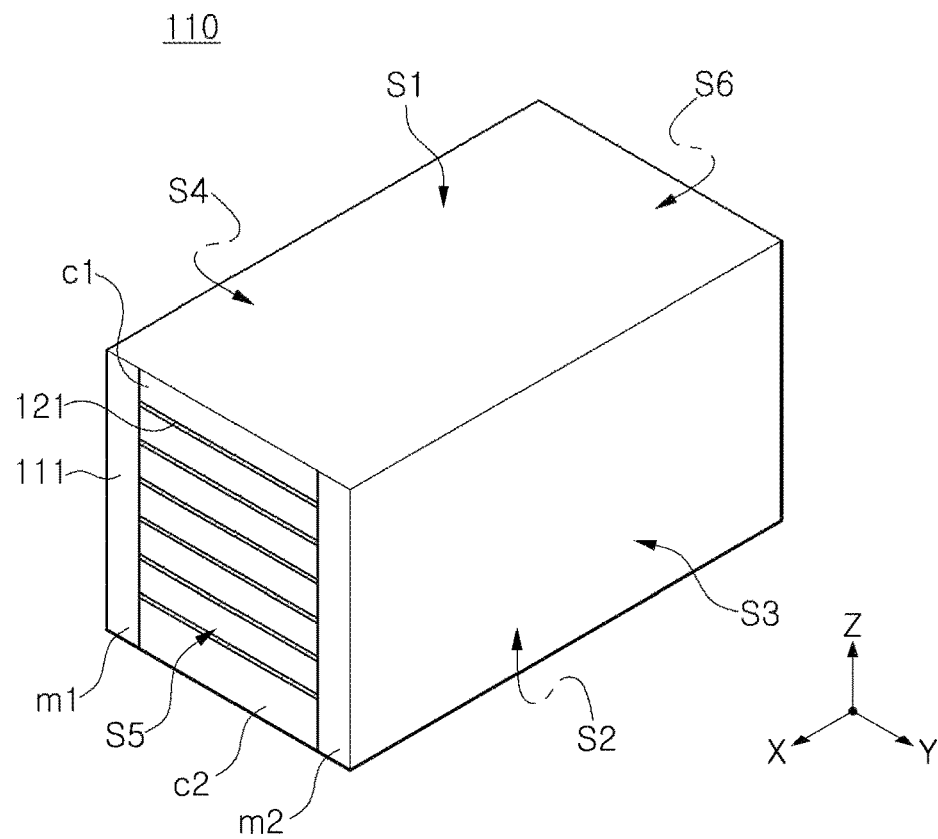
FIG. 2 is a schematic perspective view of a ceramic body of a multilayer ceramic electronic component according to an embodiment of the present disclosure.
Figure 3:
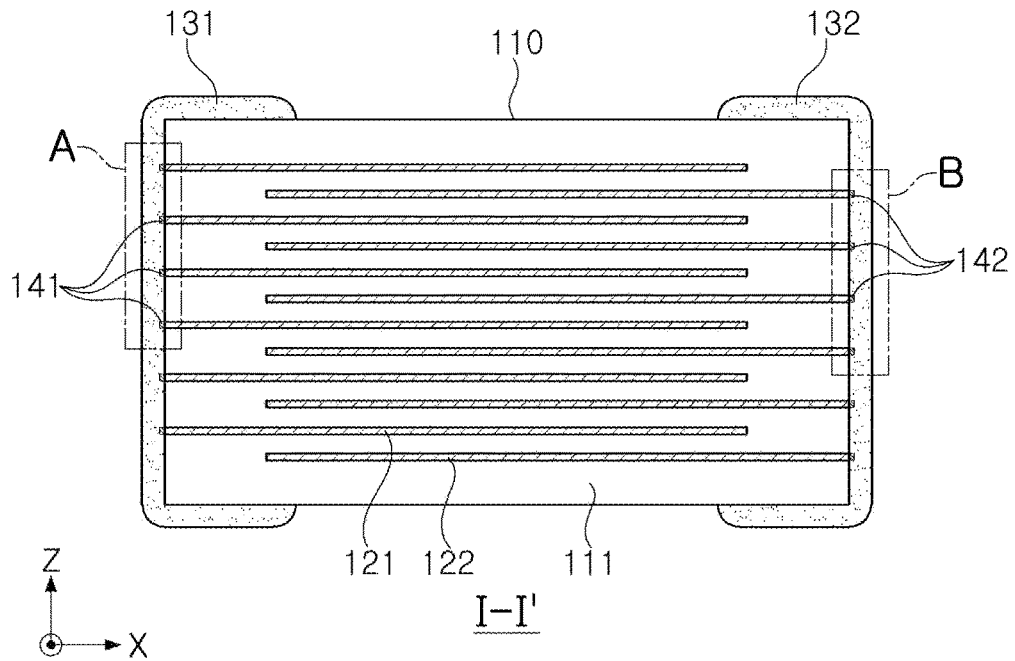
FIG. 3 is a cross-sectional view taken along line I-I' in FIG. 1.
Figure 4:
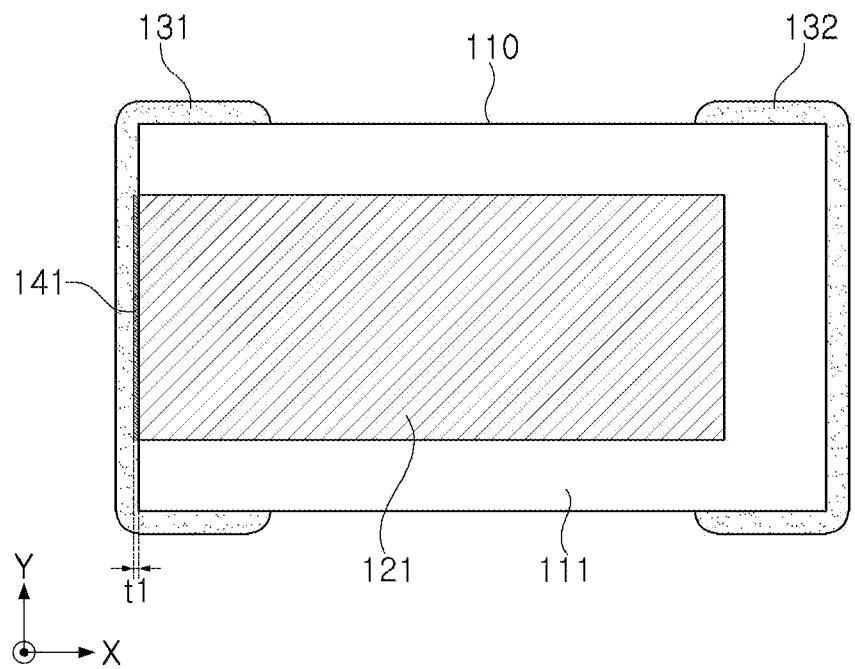
FIG. 4 is a cross-sectional view taken in an X-Y direction of FIG. 1 and illustrates a cross section in which a first internal electrode is visible.
Figure 5:
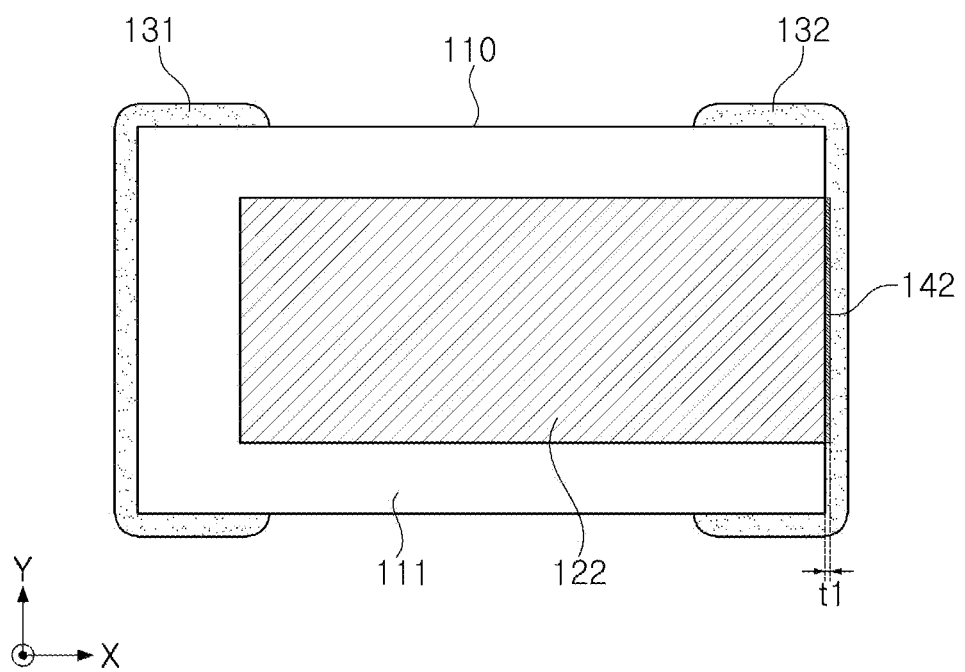
FIG. 5 is a cross-sectional view taken in the X-Y direction of FIG. 1 and illustrates a cross section in which a second internal electrode is visible.
Figure 6:
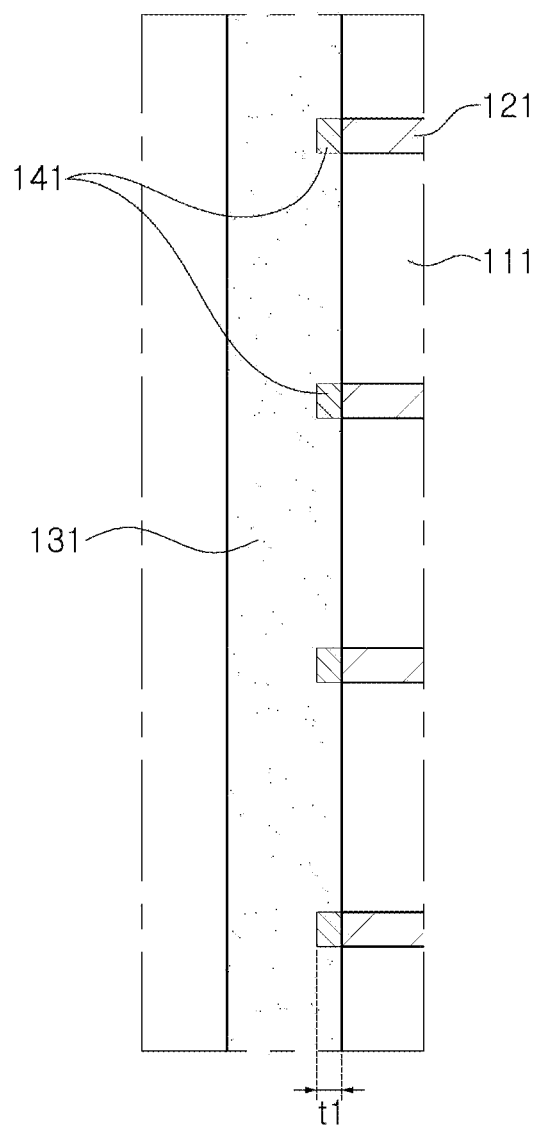
FIG. 6 is an enlarged view of region A in FIG. 3.
Figure 7:
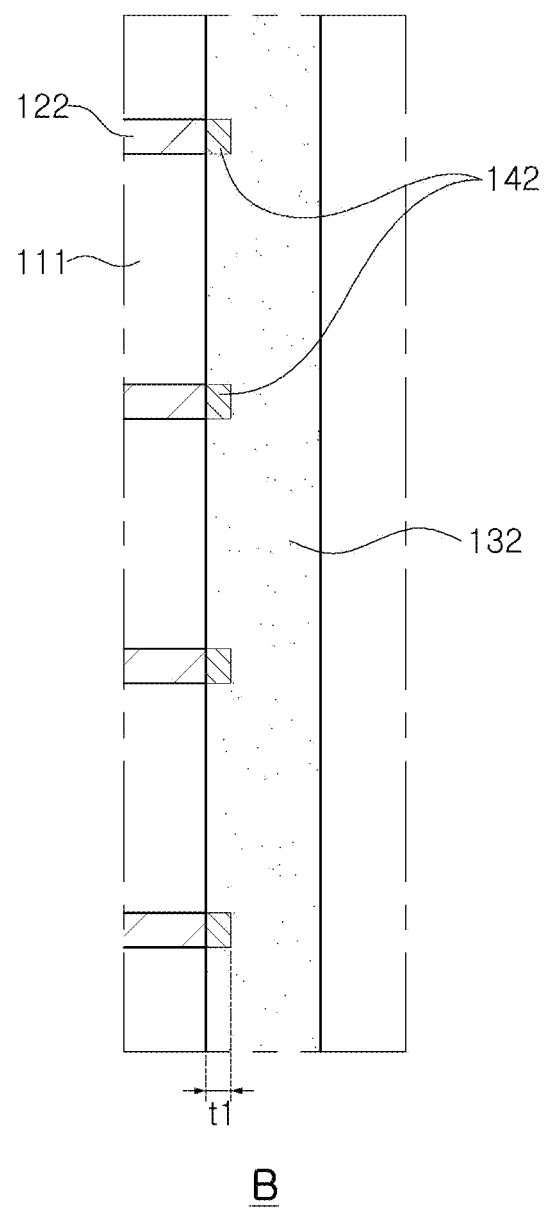
FIG. 7 is an enlarged view of region B in FIG. 3.

Hereinafter, embodiments of the present disclosure will be described in detail with reference to the accompanying drawings. The present disclosure may, however, be exemplified in many different forms and should not be construed as being limited to the specific embodiments set forth herein, but should be understood to include various modifications, equivalents, and/or alternatives to the embodiments of the present disclosure. In relation to the description of the drawings, similar reference numerals may be used for similar components.

In the description, irrelevant descriptions will be omitted to clearly describe the present disclosure. In the drawings, thicknesses may be magnified to clearly express a plurality of layers and areas. The same elements having the same function within the scope of the same concept will be described with use of the same reference numerals. Throughout the specification, when a component is referred to as "comprise" or "comprising" one or more other components, it means that it may include further components as well, rather than excluding further components, unless specifically stated otherwise.

In the present specification, expressions such as "having", "may have", "comprises", or "may contain" may include a presence of a corresponding feature (e.g., components such as numerical, functions, operations, components, or the like) without excluding the presence of additional feature does(s).

In the present specification, expressions such as "A or B", "at least one of A or/and B", "one or more of A or/and B", or the like may include all possible combinations items listed together. For example, "A or B," "at least one of A and B," or "at least one of A or B" may refer to include cases of (1) at least one A, (2) at least one B, or (3) both including at least one A and at least one B.

In the drawings, an X direction may be defined as a first direction, a length (L) direction, or a longitudinal direction; a Y direction may be defined as a second direction, a W direction, or a width direction; and a Z direction may be defined as a third direction, a T direction, or a thickness direction.

Hereinafter, a multilayer ceramic electronic component according to an embodiment of the present disclosure will be described in detail with reference to FIGS. 1 to 7.

A multilayer ceramic electronic component 100 may include a ceramic body 110 having fifth and sixth surfaces S5 and S6 opposing each other in a first direction (an X direction) and first and second surfaces S1 and S2 opposing each other in a third direction (a Z direction), and including first and second internal electrodes 121 and 122 are alternately laminated in the third direction (the Z direction) with respective dielectric layers 111 interposed therebetween, and first and second external electrodes 131 and 132, respectively disposed on the fifth and sixth surfaces S5 and S6 of the ceramic body 110. The first and second internal electrodes 121 and 122 may be respectively exposed to the fifth and sixth surfaces S5 and S6 of the ceramic body 110.

In this case, first and second protrusions 141 and 142, each including a carbon compound, may be respectively disposed on end portions of the first and second internal electrodes 121 and 122 exposed to the fifth and sixth surfaces S5 and S6 of the ceramic body 110.

In this specification, the sentence "each of the first protrusion 141 and the second protrusion 142 includes a carbon compound" may mean that at least a portion of elements of the first and second protrusions 141 and 142 is carbon, and may mean that each of the first and second protrusions 141 and 142 is formed from a carbon-containing compound.

A shape of the ceramic body 110 is not necessarily limited, but may be a hexahedral shape or a shape similar to a hexahedral shape, as illustrated in the drawings. Even in the case that the ceramic body 110 does not have a hexahedral shape having perfectly straight lines due to shrinkage of ceramic powder particles included in the ceramic body 110 in a sintering process, the ceramic body 110 may have a substantially hexahedral shape. The ceramic body 110 may have first and second surfaces S1 and S2 opposing each other in the thickness direction (the Z direction), third and fourth surfaces S3 and S4 connected to the first and second surfaces S1 and S2 and opposing each other in the width direction (the Y direction), and fifth and sixth surfaces S5 and S6 connected to the first and second surfaces S1 and S2 as well as to the third and fourth surfaces S3 and S4 and opposing each other in the length direction (the X direction).

The ceramic body 110 may be formed by alternately laminating a ceramic green sheet, on which a first internal electrode 121 is printed, and a ceramic green sheet, on which a second internal electrode 122 is printed, in the thickness direction (the Z direction), wherein the ceramic green sheets form the dielectric layers 111 upon sintering.

According to an embodiment, a raw material of the dielectric layer 111 is not necessarily limited as long as sufficient capacitance may be obtained therewith. For example, the raw material of the dielectric layer 111 may be a barium titanate-based material, a lead complex Perovskite-based material, a strontium titanate-based material, or the like.

A variety of ceramic additives, organic solvents, plasticizers, binders, dispersants, and the like may be added to powder particles such as barium titanate ($BaTiO_3$), and the like, depending on the purpose of the present disclosure.

For example, the dielectric layer 111 may be formed by applying and drying slurry including powder particles such as barium titanate ($BaTiO_3$) powder particles, or the like, on a carrier film, to prepare a plurality of ceramic sheets. Each ceramic sheet may be formed by mixing ceramic powder particles, a binder, and a solvent to prepare slurry, and forming the slurry into a sheet having a thickness of several micrometers (μm) using a doctor blading method, but a method of forming the dielectric layer 111 is not limited thereto.

A multilayer ceramic electronic component of this application may be disposed such that a plurality of internal electrodes 121 and 122 are disposed to alternately overlap each other with respective dielectric layers 111 interposed therebetween. The internal electrodes 121 and 122 may include first and second internal electrodes 121 and 122, alternately disposed to overlap and face each other with respective dielectric layers 111 interposed therebetween.

The first internal electrode 121 may be exposed to one surface (e.g., S5) of the ceramic body 110 in the first direction (the X direction), and the first protrusion 141 may be disposed on an end portion of a portion of the first internal electrode 121 exposed to the one surface (e.g., S5) of the ceramic body 110 in the first direction (the X direction). The first protrusion 141 may be connected to (e.g., may contact) the first external electrode 131, and the first external electrode 131 may have one or more cavities formed in a surface thereof to accommodate the first protrusion(s) 141. The second internal electrode 122 may be exposed to the other surface (e.g., S6) of the ceramic body 110 in the first direction (the X direction), and the second protrusion 142 may be disposed on the other surface (e.g., S6) of the ceramic body 110 in the first direction (the X direction). The second protrusion 142 may be connected to (e.g., may contact) the second external electrode 132, and the second external electrode 132 may have one or more cavities formed in a surface thereof to accommodate the first protrusion(s) 142. The first and second internal electrodes 121 and 122 may be electrically separated from each other by the dielectric layer 111 disposed therebetween.

A material of the first and second internal electrodes 121 and 122 is not necessarily limited. For example, the first and second internal electrodes 121 and 122 may be formed using a conductive paste including at least one of silver (Ag), palladium (Pd), gold (Au), platinum (Pt), nickel (Ni), copper (Cu), tin (Sn), tungsten (W), titanium (Ti), and alloys thereof. A printing method of the conductive paste may be a screen-printing method, a gravure printing method, or the like, but is not limited thereto.

As an example, the carbon compound included in the first protrusion 141 and the second protrusion 142 may be crystalline carbon. In this specification, crystalline carbon may refer to a compound composed of carbon elements arranged very regularly to have crystallinity and may refer to a carbon compound which is not an amorphous solid. The crystalline carbon may be one selected from the group consisting of carbon nanotubes (CNT), graphite, graphene, carbon black, carbon nanofibers, carbon nanowires, carbon nanohorn, carbon aerogel, carbon nanoring, and fullerene (C60), but is not limited thereto. In the multilayer ceramic electronic component according to the present example, crystalline carbon may be applied to the first and second protrusions 141 and 142 disposed on the exposed end portions of the first and second internal electrodes 121 and 122 of the ceramic body 110, so that the first and second protrusions 141 and 142 may substantially serve as anti-oxidation layers.

In an embodiment, in the first and second protrusions 141 and 142 of the multilayer ceramic electronic component, a full width at half maximum (FWHM) of G-peak may be in the range of 50 cm$^{-1}$ to 80 cm$^{-1}$ in a Raman spectrum. In this specification, the Raman spectrum may refer to a spectrum measured by Raman spectroscopy, and the Raman spectroscopy may refer to a method of finding out optical characteristics and phonon characteristics of a corresponding material by measuring scattered light having a difference by a phonon frequency during exposure to monochromatic light such as laser light. The Raman spectrum may be a value measured using a Raman spectrometer LabRam HR-800 manufactured by HORIBA, Ltd., Japan. In addition, the full width at half maximum (FWHM) may refer to a width of an emission peak at half of the maximum intensity of a corresponding peak. The G-peak is a peak formed around 1580 cm$^{-1}$, and indicates a graphitization tendency. When FWHM of the first and second protrusions 141 and 142 satisfies the above range, carbon included in the first and second protrusions 141 and 142 may have high crystallinity to effectively suppress permeation of oxygen and/or water molecules.

In another embodiment, in the first and second protrusions 141 and 142 of the multilayer ceramic electronic component, D-peak, distinguished from the G-peak, may be formed in the Raman spectrum. The D-peak is a peak formed around 1340 cm$^{-1}$ and indicates the degree of defect. In the case of carbon having low crystallinity, FWHM of the D-peak corresponding to a defect is so large that the D-peak and the G-peak may not be distinguished from each other. Meanwhile, it can be confirmed that in the first and second protrusions 141 and 142, a D-peak, distinguished from a G-peak, is formed in the Raman spectrum to show a reduction in defect of carbon and recovery of crystallinity.

As an example, each of the first and second protrusions 141 and 142 of the multilayer ceramic electronic component may have a length t1 of 0.7 nm or more. The length t1 of each of the first and second protrusions 141 and 142 may refer to a length of each of the first and second protrusions 141 and 142 in the first direction (the X direction). The length t1 of each of the first and second protrusions 141 and 142 may be 0.7 nm or more, 0.8 nm or more, 0.9 nm or more, or 1.0 nm or more, and an upper limit thereof is not necessarily limited and may be, for example, 1 μm or less. Considering that a single layer of carbon has a height of about 0.335 nm based on graphite, each of the first and second protrusions 141 and 142 may have a length t1 corresponding to a height greater than a height of two layers of carbon. That is, this example means that the length t1 of each of the first and second protrusions 141 and 142 may have a value greater than a height of at least two layers of carbon and may satisfy the above length range to sufficiently implement an anti-oxidation function, and thus, long-term reliability may be improved in a high-temperature and high-humidity environment. In one example, the first and second protrusions 141 and 142 may have a length or thickness of 1-30 of the carbon layers, such as a length or thickness of up to 30 carbon layers.

As an example, the carbon compound, included in the first and second protrusions 141 and 142, may include first grains, and the first and second internal electrodes 121 and 122 may include a conductive metal having second grains. In this case, a ratio of a particle size $D50_C$ of the first grain to a particle size $D50_E$ of the second grain ($D50_C/D50_E$) may be in the range of 0.7 to 1.3. The first and second protrusions 141 and 142 may be formed through a heat treatment, as described later. Carbon, included in the first and second protrusions 141 and 142, form the first grains during the high-temperature heat treatment. In the case of the first and second internal electrodes 121 and 122, the above-described conductive metal particles form the second grains during a sintering process. In this case, since the first grains are formed while recovering crystallinity of carbon bound to surfaces of the conductive metal particles such as nickel or the like, each of the first grains has a size similar to a size of each of the second grains formed from the conductive metal particles such as nickel or the like. This results from a method, significantly different from a conventional method in which a graphene oxide, or the like, is transformed into a solution state to form crystals. As the first and second grains are formed through the above process, the ratio of the particle size $D50_C$ of the first grain to the particle size $D50_E$ of the second grain ($D50_C/D50_E$) may satisfy the range of 0.7 to 1.3. In addition, carbon crystal particles having a uniform size may be formed to further improve the long-term reliability in a high-temperature and high-humidity environment.

The multilayer ceramic electronic component of this application may include cover portions c1 and c2. The cover portions c1 and c2 may be disposed at the outermost sides of the first and second internal electrodes 121 and 122, respectively. The cover portions c1 and c2 may be disposed below a lowermost internal electrode of the ceramic body 110 and above an uppermost internal electrode of the ceramic body 110, respectively. In this case, the cover portions c1 and c2 may have the same composition as the dielectric layer 111, and may be formed by respectively laminating at least one dielectric layer, not including an internal electrode, above the uppermost internal electrode of the ceramic body 110 and below the lowermost internal electrode of the ceramic body 110. The cover portions c1 and c2 may basically serve to prevent damage, caused by physical or chemical stress, to the internal electrode.

In the multilayer ceramic electronic component of this application, margin portions m1 and m2 may be disposed on opposing surfaces of the ceramic body 110 in the second direction. The margin portions m1 and m2 may be disposed on both surfaces of the ceramic body 110 in the second direction (the Y direction) perpendicular to the first and third directions (the X and Z directions). The margin portions m1 and m2 may serve to prevent damage, caused by a physical or chemical stress, to the internal electrode.

The margin portions m1 and m2 may be formed of an insulating material, and may be formed of a ceramic material such as barium titanate, or the like. In this case, the margin portion may include the same ceramic material as that included in the dielectric layer 111 or may be formed of the same material as the dielectric layer 111.

A method of forming the margin portions m1 and m2 is not necessarily limited. For example, the dielectric layer, included in the ceramic body 110, is formed to have an area larger than an area of the internal electrode, and thus, a margin portion region may be formed in a circumferential portion of the dielectric layer except for (or outside of) a portion of the dielectric layer having the internal electrode thereon. Alternatively, the margin portion may be formed by applying slurry including ceramic or by attaching a dielectric sheet to both surfaces of the ceramic body 110 in the second direction (the Y direction).

The multilayer ceramic electronic component of this application may include a first external electrode 131 and a second external electrode 132, respectively disposed on a fifth surface S5 and a sixth surface S6 of a ceramic body. The first external electrode 131 may be connected to the first internal electrode(s) 121, and the second external electrode 132 may be connected to the second internal electrode(s) 122. Each of the first and second external electrodes 131 and 132 may be formed of a conductive paste including a conductive metal and glass.

The conductive metal, included in the first external electrode 131 and the second external electrode 132, is not necessarily limited and may be at least one of, for example, copper (Cu), nickel (Ni), tin (Sn), palladium (Pd), platinum (Pt), gold (Au), silver (Ag), tungsten (W), titanium (Ti), lead (Pb), and alloys thereof.

The glass may be at least one selected from the group consisting of, for example, silicon (Si), boron (B), aluminum (Al), a transition metal, an alkali metal, an alkaline earth metal, an oxide nitride, a carbide, and a carbonate, but is not limited thereto. The transition metal may be at least one selected from the group consisting of zinc (Zn), titanium (Ti), copper (Cu), vanadium (V), manganese (Mn), iron (Fe), and nickel (Ni). The alkali metal may be at least one selected from the group consisting of lithium (Li), sodium (Na), and potassium (K). The alkaline earth metal may be at least one selected from the group consisting of magnesium (Mg), calcium (Ca), strontium (Sr), and barium (Ba).

A method of forming the first external electrode 131 and the second external electrode 132 is not necessarily limited. For example, the first external electrode 131 and the second external electrode 132 may be formed by various methods such as a method of dipping a ceramic body in a conductive paste including a conductive metal and reactive glass, a method of printing the conductive paste on a surface of a ceramic body in a screen printing manner or a gravure printing manner, a method of applying the conductive paste on a surface of a ceramic body, a method of transferring a dry film, formed by drying the conductive paste, onto a ceramic body, or the like, but a method of forming the first and second external electrodes 131 and 132 is not limited thereto.

The present disclosure also relates to a method of manufacturing a multilayer ceramic electronic component. A method of manufacturing a multilayer ceramic electronic component according to an embodiment may include sintering a ceramic body including dielectric layers and first and second internal electrodes laminated in a third direction with respective dielectric layers interposed therebetween, and performing grain growth of carbon in end portions of the first and second internal electrodes of the ceramic body. The descriptions of the dielectric layers, the internal electrodes, and the ceramic body are the same as given above, and will be omitted.

In an embodiment, the performing grain growth of carbon in end portions of the first and second internal electrodes of the ceramic body may include performing a heat treatment on the ceramic body. Hydrocarbon, or the like, may be heat-treated to remove hydrogen and to crystallize carbon. In this case, when a temperature of the heat treatment is increased to about 700° C. to 1300° C., a crystalline molecular structure is increased to increase the degree of crystallinity of carbon. In the method of manufacturing a multilayer ceramic electronic component of this application, the ceramic body may be sintered and then be heat-treated again to crystallize carbon bound to a conductive metal of an internal electrode.

In an embodiment, the grain growth of carbon may be performed within a temperature range of 700° C. to 1300° C. The temperature is not necessarily limited as long as the crystallinity of carbon may be increased within the temperature range, and may be appropriately adjusted depending on ingredients included in the dielectric layer and/or the internal electrode.

In an embodiment, grain growth of the carbon may be performed under an atmosphere of hydrogen and hydrocarbon compound having 1 to 16 carbon atoms. The hydrocarbon compound is an ingredient for forming first and second protrusions of this application having a predetermined size or more, and may refer to a linear, branched, and/or cyclic hydrocarbon compound having 1 to 16 carbon atoms. In addition, the hydrogen is provided to reduce oxidized carbon bound to the conductive metal of the internal electrode, and may allow the reduced carbon to form a crystal.

In another embodiment, the grain growth of carbon may be performed under an argon atmosphere. Argon is a representative inert gas, and may serve as a carrier gas. In addition, argon may serve to prevent oxidation and decomposition of carbon crystals at a high temperature and to help in decomposing a carbon source such as hydrocarbon or the like.

As an example, the performing grain growth of the carbon may include performing grain growth of carbon atoms into three or more layers. The number of laminated layers of carbon atoms may be measured from 2D-peak formed around 2700 $cm^{-1}$ and calculated by the Raman spectroscopy. In the method of manufacturing a multilayer ceramic electronic component of this application, the first and second protrusions 141 and 142 formed on the end portions of the first and second internal electrodes 121 and 122 may have a thickness enough to serve as anti-oxidation layers as the grain growth of the carbon atoms is performed into three or more layers. On the other hand, when the carbon atoms are formed into less than three layers, permeation of oxygen molecules and/or water molecules may not be suppressed, and thus, it may be difficult to expect a reliability improvement effect. For example, the first and second protrusions 141 and 142 may have a thickness of 1-30 carbon layers As an example, the method of manufacturing a multilayer ceramic electronic component of this application may further include decreasing a temperature at a rate of less than 20° C./min after performing the grain growth of carbon. In carbon having crystallinity recovered through the above-described heat treatment, a crystal size or the number of laminated layers may be changed depending on the temperature decreasing rate. In the method of manufacturing a multilayer ceramic electronic component of this application, a temperature may be decreased at the rate of less than 20° C./min to adjust the number of laminated layers of carbon atoms.

Hereinafter, although the present disclosure will be described in detail with reference to an embodiment, which has been disclosed for illustrative purposes, it is not limited thereto.

Embodiment 1

A chip, used in samples below, was a chip in which the ceramic body corresponding to a 3225 size (e.g., L=3.2 mm×W=2.5 mm) was barrel ground. Each of the samples was put into a quartz tube inside a furnace after being placed on an aluminum oxide substrate having a size of 4.0×4.0 cm. Then, a heat treatment was performed under conditions shown in Table 1.

TABLE 1

| Sample | Temperature (° C.) | Gases used | | | Temperature Decreasing Rate | Pressure |
|---|---|---|---|---|---|---|
| | | $CH_4$ | $H_2$ | Ar | | |
| 1 | 700 | 1 sccm | 200 sccm | — | 20° C./min | $4 \times 10^{-1}$ Torr |
| 2 | 800 | 5 sccm | 200 sccm | — | 20° C./min | $4 \times 10^{-1}$ Torr |
| 3 | 900 | 10 sccm | 200 sccm | — | 20° C./min | $4 \times 10^{-1}$ Torr |
| 4 | 1000 | 10 sccm | 200 sccm | — | 50° C./min | $4 \times 10^{-1}$ Torr |
| 5 | 1050 | 10 sccm | 200 sccm | — | 30° C./min | $4 \times 10^{-1}$ Torr |
| 6 | 1050 | 10 sccm | 200 sccm | — | 10° C./min | $4 \times 10^{-1}$ Torr |
| 7 | 1050 | 10 sccm | 200 sccm | — | 5° C./min | $4 \times 10^{-1}$ Torr |
| 8 | 1050 | 10 sccm | 200 sccm | 1000 sccm | 5° C./min | $7 \times 10^{3}$ Torr |

TABLE 2

| | Characteristics | | | Number of Layers of | Long-Term Reliability (8585 Test) ○: OK |
|---|---|---|---|---|---|
| Sample | ESR | Capacitance | DF | Carbon | X: NG |
| 1 | 8.4 mΩ | 9.8 uF | 0.028009 | 1 | X |
| 2 | 8.3 mΩ | 9.8 uF | 0.03143 | 1 | X |
| 3 | 8.7 mΩ | 9.7 uF | 0.032275 | 1 | X |
| 4 | 7.9 mΩ | 9.9 uF | 0.032109 | 1 | X |
| 5 | 7.8 mΩ | 9.7 uF | 0.031325 | 2 | X |
| 6 | 7.6 mΩ | 9.6 uF | 0.028587 | 3 | ○ |
| 7 | 7.3 mΩ | 9.7 uF | 0.031529 | 6 | ○ |
| 8 | 6.9 mΩ | 9.7 uF | 0.03137 | 7 | ○ |

Table 2 shows characteristics of the samples after the heat treatment was performed under the conditions of Table 1. In Table 2, the number of layers of carbon was calculated using LabRam HR-800, a Raman spectrometer, manufactured by HORIBA Ltd., Japan. In addition, the long-term reliability was examined by determining whether failure occurred when a voltage of 1.5 VR was applied at a temperature of 85° C. and relative humidity (RH) of 85%.

As can be seen from Table 2, when a temperature was decreased at a temperature decreasing rate of less than 20° C./min after the heat treatment, the number of laminated layers of carbon was three or more and, when the number of layers of carbon disposed on an end portion of an internal electrode is three or more, long-term reliability was improved.

Figure 8:
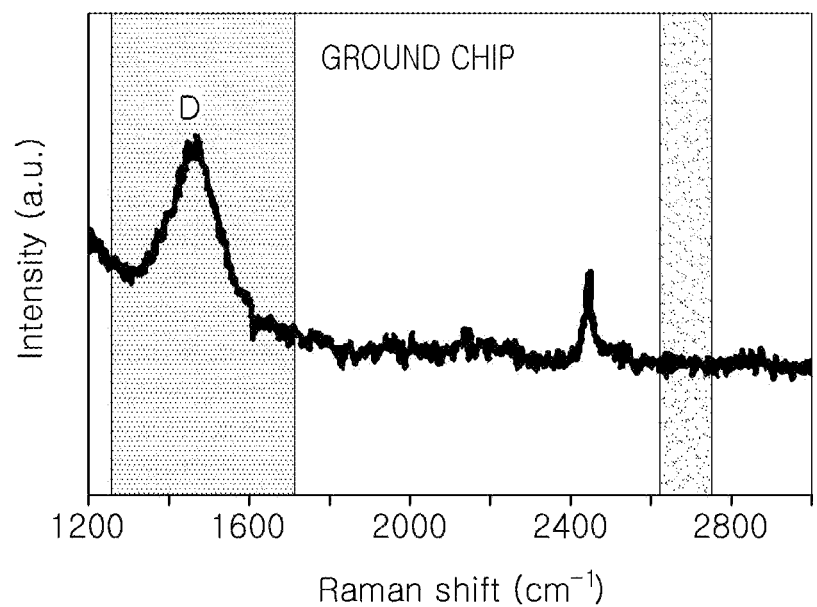
FIG. 8 is a graph showing a Raman spectrum of a multilayer ceramic electronic component according to the related art.
Figure 9:
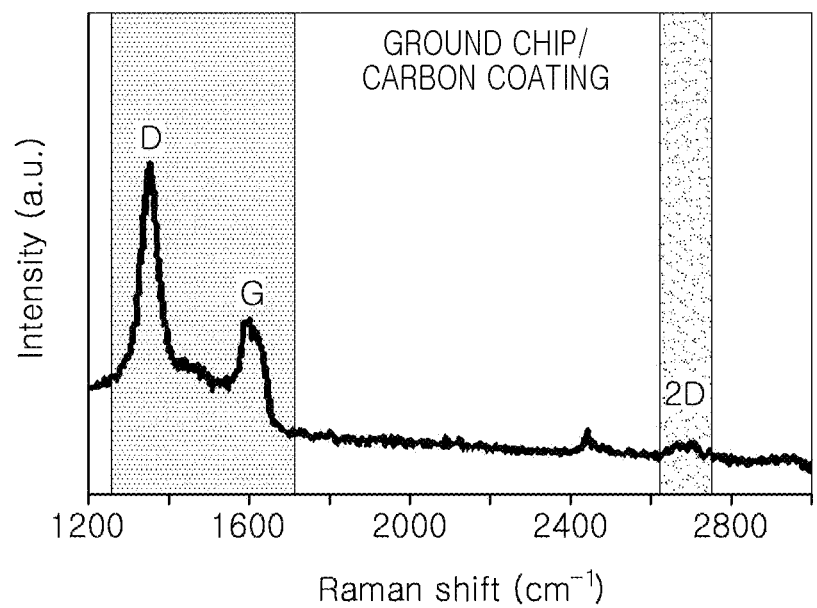
FIG. 9 is a graph showing a Raman spectrum of a multilayer ceramic electronic component according to an embodiment of the present disclosure.

FIG. 8 is a graph showing a Raman spectrum of a multilayer ceramic electronic component according to the related art, and FIG. 9 is a graph showing a Raman spectrum of a multilayer ceramic electronic component according to an embodiment. As can be seen from FIGS. 8 and 9, in a chip subjected to a heat treatment, G-peak was recovered and a full width at half maximum (FWHM) of D-peak corresponding to a defect was reduced.

As described above, according to an embodiment, a multilayer ceramic electronic component, capable of preventing permeation of external moisture, or the like, and a method of manufacturing the multilayer ceramic electronic component may be provided.

According to an embodiment, a multilayer ceramic electronic component, capable of preventing oxidation of an internal electrode, and a method of manufacturing the multilayer ceramic electronic component may be provided.

According to another embodiment, a multilayer ceramic electronic component having improved process efficiency and a method of manufacturing the multilayer ceramic electronic component may be provided.

According to another embodiment, a multilayer ceramic electronic component having improved long-term reliability and a method of manufacturing the multilayer ceramic electronic component may be provided.

While embodiments have been shown and described above, it will be apparent to those skilled in the art that modifications and variations could be made without departing from the scope of the present disclosure as defined by the appended claims.

What is claimed is:

1. A multilayer ceramic electronic component comprising:
a ceramic body having fifth and sixth surfaces opposing each other in a first direction and first and second surfaces opposing each other in a third direction, and including a capacitance forming portion in which first and second internal electrodes are alternately laminated in the third direction with respective dielectric layers interposed therebetween; and first and second external electrodes, respectively disposed on the fifth and sixth surfaces of the ceramic body, wherein the first and second internal electrodes are respectively exposed to the fifth and sixth surfaces of the ceramic body, and first and second protrusions, each including a carbon compound, are respectively disposed on, and extending in the third direction as a layer to cover, end portions of the first and second internal electrodes exposed to the fifth and sixth surfaces of the ceramic body.

2. The multilayer ceramic electronic component of claim 1, wherein each of the first and second protrusions includes crystalline carbon.

3. The multilayer ceramic electronic component of claim 2, wherein each of the first and second protrusions has a length of 1-30 layers of the crystalline carbon.

4. The multilayer ceramic electronic component of claim 1, wherein in the first and second protrusions, a full width at half maximum (FWHM) of G-peak is in the range of 50 cm$^{-1}$ to 80 cm$^{-1}$ in a Raman spectrum.

5. The multilayer ceramic electronic component of claim 1, wherein in the first and second protrusions, a D-peak is distinguished from a G-peak.

6. The multilayer ceramic electronic component of claim 1, wherein each of the first and second protrusions has a length of 0.7 nm or more.

7. The multilayer ceramic electronic component of claim 1, wherein the carbon compound includes a first grain, each of the first and second internal electrodes includes a conductive metal including a second grain, and a ratio of a particle size $D50_C$ of the first grain to a particle size $D50_E$ of the second grain ($D50_C/D50_E$) is in the range of 0.7 to 1.3.

8. A method of manufacturing the multilayer ceramic electronic component of claim 1, the method comprising: sintering to form the ceramic body; and performing grain growth of carbon in the end portions of the first and second internal electrodes of the ceramic body to form the first and second protrusions, respectively.

9. The method of claim 8, wherein the grain growth of carbon is performed within a temperature range of 700° C. to 1300° C.

10. The method of claim 8, wherein the grain growth of carbon is performed under an atmosphere of hydrocarbon compound and hydrogen having 1 to 16 carbon atoms.

11. The method of claim 8, wherein the grain growth of carbon is performed under an argon atmosphere.

12. The method of claim 8, wherein the performing grain growth of carbon includes performing grain growth of carbon atoms into three layers or more.

13. The method of claim 8, further comprising:
decreasing a temperature at a rate of less than 20° C./min after performing the grain growth of carbon.

14. The method of claim 8, wherein the grain growth of carbon is performed in the end portions of the first and second internal electrodes exposed on respective opposing surfaces of the ceramic body.

15. The method of claim 14, further comprising: following the grain growth of the carbon in end portions of the first and second internal electrodes of the ceramic body, forming the first and second external electrodes on the respective opposing surfaces of the ceramic body to respectively connect to the first and second internal electrodes.

16. A multilayer ceramic electronic component comprising:

a ceramic body including dielectric layers having internal electrodes disposed thereon; and one or more external electrodes disposed on the ceramic body and connected to the internal electrodes, wherein each internal electrode is connected to a respective external electrode of the one or more external electrodes through a carbon compound, and is spaced apart from the respective external electrode by the carbon compound.

17. The multilayer ceramic electronic component of claim 16, wherein the carbon compound disposed in a space between each internal electrode and the respective external electrode includes crystalline carbon.

18. The multilayer ceramic electronic component of claim 17, wherein the carbon compound disposed in the space between each internal electrode and the respective external electrode includes at least one of carbon nanotubes (CNT), graphite, graphene, carbon black, carbon nanofibers, carbon nanowires, carbon nanohorn, carbon aerogel, carbon nanoring, and fullerene (C60).

19. The multilayer ceramic electronic component of claim 16, wherein the carbon compound disposed in a space between each internal electrode and the respective external electrode has a full width at half maximum (FWHM) of G-peak may be in the range of 50 cm$^{-1}$ to 80 cm$^{-1}$ in a Raman spectrum.

20. The multilayer ceramic electronic component of claim 16, wherein the carbon compound disposed in a space between each internal electrode and the respective external electrode has a peak around 1580 cm$^{-1}$ in a Raman spectrum.

21. The multilayer ceramic electronic component of claim 16, wherein a length of the carbon compound by which each internal electrode is spaced apart from the respective external electrode is 0.7 nm or more and 1 µm or less.

22. The multilayer ceramic electronic component of claim 16, wherein a length of the carbon compound by which each internal electrode is spaced apart from the respective external electrode is 1-30 layers of the carbon compound.

23. A multilayer ceramic electronic component comprising:

a ceramic body including dielectric layers having internal electrodes disposed thereon, the internal electrodes being exposed to external surfaces of the ceramic body; and one or more external electrodes disposed on the external surfaces of the ceramic body and connected to the internal electrodes, wherein each external electrode has a planar surface disposed directly on a respective external surface of the body, and a plurality of cavities extending in the planar surface and having a carbon compound therein.

24. The multilayer ceramic electronic component of claim 23, wherein each cavity is adjacent to an internal electrode exposed to an external surface of the ceramic body.

25. The multilayer ceramic electronic component of claim 23, wherein a depth of each cavity in each external electrode is 0.7 nm or more and 1 µm or less.

26. The multilayer ceramic electronic component of claim 23, wherein the carbon compound disposed in the cavities extending in each external electrode includes at least one of carbon nanotubes (CNT), graphite, graphene, carbon black, carbon nanofibers, carbon nanowires, carbon nanohorn, carbon aerogel, carbon nanoring, and fullerene (C60).

* * * * *